May 1, 1951 H. CHIREIX 2,550,772

FREQUENCY MODULATED WAVE GENERATOR

Filed Nov. 20, 1948

Inventor
Henri Chireix
By Haseltine, Lake & Co.
Agents

Patented May 1, 1951

2,550,772

UNITED STATES PATENT OFFICE 2,550,772

FREQUENCY-MODULATED WAVE GENERATOR

Henri Chireix, Paris, France, assignor to Societe Française Radio-Electrique, a corporation of France Application November 20, 1948, Serial No. 61,218
In France December 23, 1947

1 Claim. (Cl. 332—25)

The present invention relates to a device for obtaining directly, with the use of particularly simple means, a frequency modulated wave, or rather a phase modulated wave wherein the law governing the phase variation is strictly linear in accordance with the modulating current.

Furthermore, in the device according to the invention, the phase modulation index thereby obtained may be relatively very high, and the device is capable of undergoing modulations of very high cadence.

According to one object of the invention, the device is particularly well adapted for use in a multiple channel radio telephone communications system having a large number of channels and wherein the modulation current is produced according to the carrier wave technique. In this type of transmission, the various channels are located in adjacent spectra, the frequencies being subdivided.

According to another object, the device is also well adapted for use in a similar system where the modulation current is produced in the form of short amplitude-modulated impulses. In this type of transmission the successive impulses correspond to the successive channels, the time factor being subdivided. In this case, the end result is a succession of frequency modulated impulses having a frequency deviation proportional to the telephone signal. Such a system is comparable to the telegraphy technique known in the art as "shifting."

According to the invention, a multiple channel radio-telephone communications system, operating on ultra-short waves, comprises, at the transmitting end, the generation of a frequency modulated pilot wave having the characteritsics hereinafter described, said wave being amplified, multiplied and, if needed, transposed by known means, in order to obtain, finally, the desired frequency and a predetermined power output. At the receiving end, the system comprises a frequency modulation receiver, known per se, followed by a frequency discriminator, the output side of which supplies either the carrier wave spectrum or, as will be shown, a succession of short amplitude modulated impulses. The radio equipment thus provided according to the invention is suitable for use in either communications system whether based on modulation by subdivision of the range of frequencies or on subdivision of the time units.

The principal feature of the invention is the application of the modulation currents to the magnetic coil of a special vacuum tube somewhat similar to a cathode-ray oscilloscope.

The invention will be more readily understood with reference to the accompanying drawings, given by way of example, in which.

Figure 2:
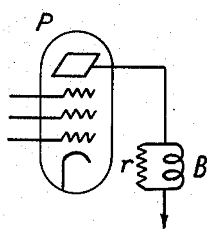
Fig. 2 shows a modification of the wiring for subdivision of time units.
Figure 3:
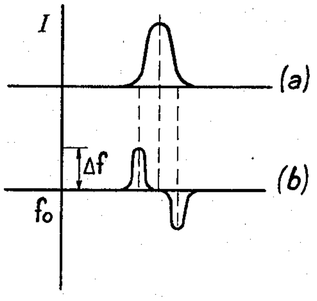

Fig. 3 (*a*) and (*b*) is a graphic representation of the current flowing through the coil of Fig. 2, and of the output frequency.

Figure 1:
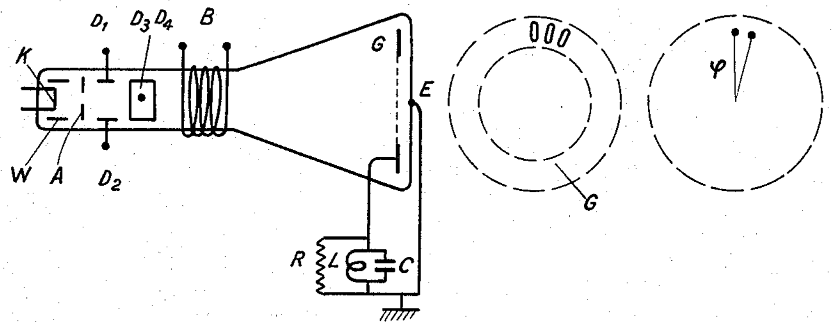
Fig. 1 is a conventional view of a tube according to the invention wired for subdivision of frequencies.

Referring to Fig. 1, the vacuum tube shown comprises all the conventional elements of a cathode-ray oscilloscope, namely cathode K, control grid W, anode A and deflector plates $D_1$, $D_2$, $D_3$, and $D_4$, whereby screen E will show a luminous spot moving in a circular path at an angular velocity determined by the field of plates $D_1$ . . . $D_4$, the latter being fed, as is well known, by a two-phase generator. Metallized screen E is grounded, and a few millimeters ahead of it is located a metallic disc or annulus G having a regular series of notches or apertures therein. Annulus G performs the function of a grid and is connected to one side of a shunted oscillating circuit LCR, the other side of which is grounded.

Such a tube obviously operates, according to the invention, as a frequency multiplier when the beam is so deflected as to cut the apertures of the annulus, circuit LCR being tuned on the frequency of the rotating field multiplied by the number of apertures.

This tube is further provided with magnet coil B. When coil B is traversed by a current I, it has the effect of deflecting the beam through an angle $\phi$ in the direction of its rotation, the order of magnitude being about 0.6 degree per ampere/turn for a 1000 volt tube. If I is a variable current the frequency will vary, the beam being alternately accelerated and retarded.

The object of the invention is therefore achieved by passing the modulation current through coil B, which may advantageously constitute the load circuit of a pentode having a high internal resistance.

The invention will first be examined now in its application to multiple channel communication subdivided in the frequency range. In the case of sinusoidal modulations applied to the different channels, the current in coil B is the sum of a given number of sinusoidal currents. Each of said currents will produce a phase modulation and hence a frequency modulation.

If $\theta$ is the polar pitch of the apertures of annulus G and $\phi$ the angular deflection resulting from one of these currents, then the phase modulation is:

$$m=2\pi\frac{\phi}{\theta}$$

and the corresponding frequency variation is:

$$\Delta f=2\pi\frac{\phi}{\theta}F$$

wherein F is the modulation frequency.

Thus, for example, with 36 apertures in annulus G, $\theta=10°$, and with $\phi=2°$, $m$ will be 1.25. This means that with a modulation frequency F 100 kc., there will be a deviation or deflection of 125 kc. Since the relationship between angle $\phi$ and the modulating current follows a linear law, the resulting frequency modulation will be strictly in accordance with the modulating current.

It can be easily verified that such defects as, for example, some ovalization of the beam trajectory or imperfections in the manufacture of the apertured grid will produce only parasite frequency modulations at the rotational frequency of the beam or its harmonics. Hence it is most advantageous to rotate the beam at a frequency higher than the frequency modulation to be transmitted. In these circumstances, the frequency developed at the terminals of circuit LCR is a high frequency of the order of possibly 10 megacycles or more.

In its application to transmission by impulses, the invention is characterized by the device of Fig. 2, wherein coil B is shunted by a resistance $r$. The self-inductance of coil B, in conjunction with the output capacity of pentode P and resistance $r$, constitutes a circuit tuned to the vicinity of the critical aperiodicity. The result is that if short impulses, appertaining to successive channels, are fed to the grid of pentode P, the current in coil B will have the shape represented graphically in Fig. 3($a$), the duration of the impulse being determined by the constants of the circuit. The resultant frequency variation, proportional to $$\frac{d\phi}{dt}$$

is therefore also proportional to $$\frac{dI}{dt}$$

as shown in Fig. 3($b$).

It will be seen that the frequency varies a quantity $\Delta f$ first in one direction then in the other, the maximum deviation corresponding to the points of inflection of the curve of Fig. 3($a$).

After discrimination at the receiving end, impulses will be picked up which reproduce the curve of Fig. 3($b$), i. e. for each impulse transmitted there will be a first impulse received, which is for example positive, and a second impulse of opposite sign, the magnitude or height of the received impulses being proportional to the amplitude of the transmitted impulse. There will be no difficulty encountered, at the receiving end, if it is desired to suppress one of the two received impulses, for example the negative impulse, by means of device having a predetermined passing level, as is well known in the art.

The order of magnitude of $\Delta f$ may be ascertained as follows: by assimilating the loop of Fig. 3 ($a$) to a triangle having a base $2\pi$, if $\phi$ is the maximum deflection of the luminous spot due to the modulating current, the instantaneous frequency variation will be $$\Delta f=\frac{\phi}{0}\cdot\frac{1}{\pi}$$

Thus, for example, if $2\pi=1$ microsecond and $\phi=2°$, $\theta=10°$ and $\Delta f=400$ kcs.

The damping of circuit LCR of Fig. 1 is adjusted according to the width of the desired band.

It will be readily understood from the examples given, which are purely illustrative and in no way intended to limit the scope of the invention, that it is possible to obtain from such a tube not only a high frequency but also a considerable deviation of that frequency. Generally speaking, it is therefore no longer necessary to effect a subsequent multiplication of a high frequency. Furthermore, if the beam rotation is obtained by means of a quartz oscillator, the medium frequency will be absolutely stable.

The screen E may be constituted either by a single layer of mixed metallic and luminescent powders, or by a thin layer of metallic powder behind one of luminescent powder. In this manner it is possible to observe from the front the beam which has been interrupted between the apertures of grid G and thus to make certain that it is suitable localized and that it describes a circle of suitable diameter.

A further point is that the potential across the terminals of circuit LCR is free of amplitude modulation.

The invention is in no way limited by the features of the examples described but extends to all features falling within the spirit and scope of the appended claim.

What is claimed is:

A frequency modulated wave generator which comprises, in combination, an oscillator of the electron beam type including a cathode ray tube and means for rotating said electron beam, a magnetic deflection coil surrounding entirely said cathode ray tube in such a manner that their respective axes substantially coincide, a source of signal frequency currents, and means to feed said currents to said deflection coil so as to vary the rotational velocity of said electron beam and to thereby modulate the instantaneous frequency of the oscillator in accordance wtih said signal currents.

HENRI CHIREIX.

REFERENCES CITED

The following references are of record in the file of this patent:

UNITED STATES PATENTS

| Number | Name | Date |
|---|---|---|
| 2,254,036 | Gray | Aug. 26, 1941 |
| 2,290,587 | Goldstine | July 2, 1942 |
| 2,300,436 | Skellett | Nov. 3, 1942 |
| 2,368,328 | Rosencrans | Jan. 30, 1945 |